United States Patent

Nogami et al.

[11] Patent Number: 5,973,466
[45] Date of Patent: Oct. 26, 1999

[54] OPERATING INFORMATION SETTING AND MANAGEMENT METHOD AND APPARATUS OF NUMERICAL CONTROL APPARATUS

[75] Inventors: Taishi Nogami; Norinaga Mutai, both of Oshino-mura, Japan

[73] Assignee: Fanuc Ltd, Yamanashi, Japan

[21] Appl. No.: 08/930,015

[22] PCT Filed: Feb. 3, 1997

[86] PCT No.: PCT/JP97/00261

§ 371 Date: Sep. 29, 1997

§ 102(e) Date: Sep. 29, 1997

[87] PCT Pub. No.: WO97/28494

PCT Pub. Date: Aug. 7, 1997

[30] Foreign Application Priority Data

Feb. 2, 1996 [JP] Japan ........................... 8-39091

[51] Int. Cl.⁶ .................. G05B 19/4155; G05B 19/408
[52] U.S. Cl. .................. 318/569; 318/570; 395/500; 395/670; 395/671
[58] Field of Search .................. 318/560–696; 364/134, 147, 468; 395/500

[56] References Cited

U.S. PATENT DOCUMENTS

| | | | |
|---|---|---|---|
| 4,442,484 | 4/1984 | Childs et al. | 364/200 |
| 4,870,590 | 9/1989 | Kawata et al. | 364/468 |
| 4,908,746 | 3/1990 | Vaughn | 364/147 |
| 5,032,975 | 7/1991 | Yamamoto et al. | 364/134 |
| 5,122,717 | 6/1992 | Hayashi | 318/569 |
| 5,737,581 | 4/1998 | Keane | 395/500 |
| 5,796,986 | 8/1998 | Fuller | 395/500 |

FOREIGN PATENT DOCUMENTS

| | | |
|---|---|---|
| 60-164207 | 10/1985 | Japan . |
| 61-185104 | 11/1986 | Japan . |
| 63-78204 | 4/1988 | Japan . |
| 2-73208 | 6/1990 | Japan . |
| 2-243241 | 9/1990 | Japan . |

*Primary Examiner*—Paul Ip
*Attorney, Agent, or Firm*—Staas & Halsey LLP

[57] ABSTRACT

A database, in which information an NC apparatus needs in machining products is accumulated for each product, is set in a hard disk connected to the NC apparatus. In this database, products are represented by numbers assigned to them. When an operator specifies a product number, information required for machining of the product corresponding to that number is retrieved and extracted from the database to be automatically transferred to a predetermined memory of the NC apparatus.

10 Claims, 6 Drawing Sheets

| MACHINING NUMBER | MAIN PROGRAM NUMBER | SUB-PROGRAM NUMBER | TOOL FILE | PARAMETER FILE | SEQUENCE PROGRAM FILE |
|---|---|---|---|---|---|
| WORK 1 | O0001 | O1005 | T1. DAT | P1. DAT | L1. DAT |
| WORK 2 | O0002 | O1010<br>O1031 | T2. DAT | P2. DAT | L2. DAT |
| WORK 3 | O0003 | O1010 | T3. DAT | P3. DAT | L3. DAT |
| : | : | : | : | : | : |
| : | : | : | : | : | : |
| : | : | : | : | : | : |

| MACHINING NUMBER | MAIN PROGRAM NUMBER | SUB-PROGRAM NUMBER | TOOL FILE | PARAMETER FILE | SEQUENCE PROGRAM FILE |
|---|---|---|---|---|---|
| WORK1 | O0001 | O1005 | T1.DAT | P1.DAT | L1.DAT |
| WORK2 | O0002 | O1010<br>O1031 | T2.DAT | P2.DAT | L2.DAT |
| WORK3 | O0003 | O1010 | T3.DAT | P3.DAT | L3.DAT |
| ⋮ | ⋮ | ⋮ | ⋮ | ⋮ | ⋮ |

FIG. 3

```
O0001 (WORK1)
G92X150. Y200. ;
G90G00X0Y0;
      ⋮
M98P1005;
      ⋮
M30;
```

```
O0002 (WORK2) ;
......
......
......
M30;
```

```
O1005 (SUB1) ;
G01X15. Y36. ;
    :
M99;
```

```
O1010 (SUB2) ;
 . . . . .
 . . . . .
 . . . . .
M99;
```
⋮

FIG. 5

T1. DAT

| OFFSET NUMBER | X-AXIS OFFSET NUMBER | Y-AXIS OFFSET NUMBER | Z-AXIS OFFSET NUMBER | TIP RADIUS (R) COMPENSATION | VIRTUAL TIP SETTING |
|---|---|---|---|---|---|
| 01 | 10.0 | 100.1 | 0 | 0.5 | 3 |
| 02 | 20.2 | 150.3 | 0 | 0.7 | 2 |
| 03 | 30.4 | 200.5 | 0 | 1.0 | 8 |

T2. DAT

| OFFSET NUMBER | X-AXIS OFFSET NUMBER | Y-AXIS OFFSET NUMBER | Z-AXIS OFFSET NUMBER | TIP RADIUS (R) COMPENSATION | VIRTUAL TIP SETTING |
|---|---|---|---|---|---|
| : | : | : | : | : | : |

T3. DAT

| OFFSET NUMBER | X-AXIS OFFSET NUMBER | Y-AXIS OFFSET NUMBER | Z-AXIS OFFSET NUMBER | TIP RADIUS (R) COMPENSATION | VIRTUAL TIP SETTING |
|---|---|---|---|---|---|
| : | : | : | : | : | : |

⋮

P1. DAT

```
0 0 0 3      0 0 1 0 0 1 1 0
0 0 0 4      0 0 1 0 0 0 1 1
  :                :
0 1 2 4            3 0 0 0
0 1 2 5            4 5 0 0
```

P2. DAT

P3. DAT

FIG. 7
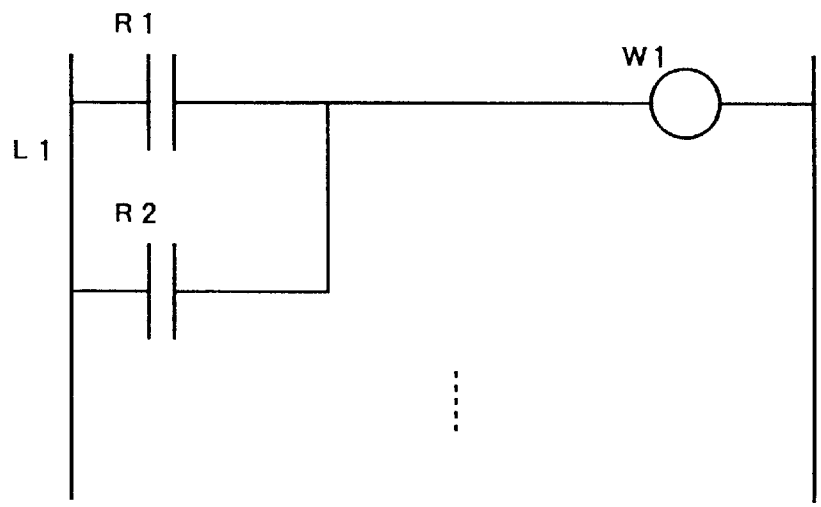
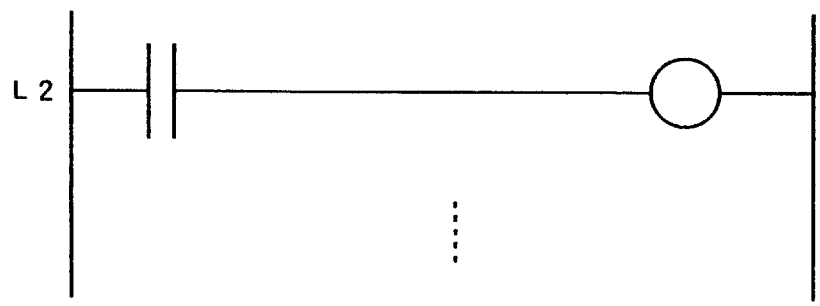
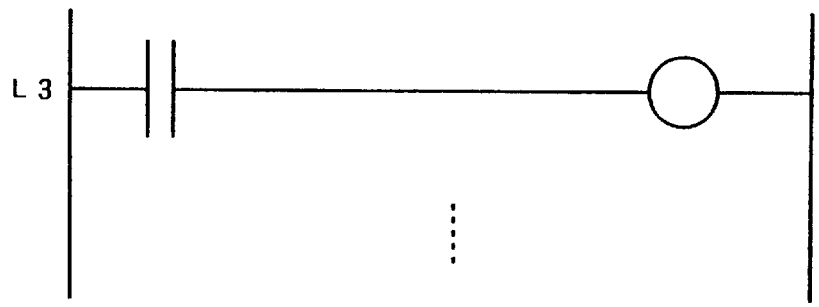

FIG. 8A

```
MACHINING INFORMATION (ROD C)
   MAIN PROGRAM···O0003
   SUB-PROGRAM····O1010
   TOOL FILE·····T3.DAT
   PARAMETER FILE··P3.DAT
   SP FILE······L3.DAT
```

FIG. 8B

| TOOL FILE T3 | | | | | |
|---|---|---|---|---|---|
| OFFSET No. | X | Z | Y | R | T |
| 05 | 3.5 | 4.0 | 3.0 | 0.3 | 5 |
| 08 | 6.8 | 10.7 | 2.5 | 0.3 | 2 |
| 11 | 5.3 | 8.1 | 7.2 | 0.1 | 3 |
| · | · | · | · | · | · |
| · | · | · | · | · | · |
| · | · | · | · | · | · |

OPERATING INFORMATION SETTING AND MANAGEMENT METHOD AND APPARATUS OF NUMERICAL CONTROL APPARATUS

This application is a 371 of PCT/JP97/00261 filed Feb. 3, 1997.

BACKGROUND OF THE INVENTION

1. Field of the Invention

This invention relates to a method and apparatus for managing and setting operating information, such as machining information, for a machine, such as a machine tool, controlled by a numerical control apparatus (hereinafter referred to as an NC apparatus).

2. Description of the Related Art

With a conventional NC apparatus, information necessary for operating a machine consisting of, for example, NC programs, such as a main program and sub-programs, to be called from the main program already prepared for machining of a product and tool information of tools to be used and offset data on those tools has had to be stored by an operator individually in a storage medium, such as a floppy disk. When the same product is to be manufactured by machining again, the NC programs and tool information necessary for the machining have had to be re-entered in a memory of the NC apparatus. Also, it has been necessary for optimal parameters regulating characteristics and movements of the machine to be set by a programmer or a system engineer in advance according to the content of the machining before the machining operation is carried out. Furthermore, sequence programs for controlling the movements of the machine have been made universal so that as many tasks as possible can be carried out by the machine, without necessitating changes.

When the same product has to be machined again, it has been necessary not only to pick out the floppy disk or other storage medium on which the main program and sub-programs necessary for the machining are stored, but also to enter them into the NC apparatus and set tool data and parameters to be used in the machining through a CRT/MDI unit or the like. This has been a cumbersome and time-consuming process. Additionally when there is an error in the entering or setting of this machining information, the machine may not operate correctly and incorrect machining may be carried out.

SUMMARY OF THE INVENTION

It is a first object of the invention to provide a method designed to easily enter a main program, sub-programs and information, such as tool information, necessary for operating a machine controlled by a numerical control apparatus, into the numerical control apparatus.

To achieve the above object, an operating information setting method for a machine controlled by a numerical control apparatus is supplied with information necessary for the machine to operate. The information is stored in a memory of the numerical control apparatus by the task to be performed at the time of operation (hereinafter referred to as an operation task). When an operation task is selected, and the information necessary to perform the selected operation task is read out from the memory and set as operation and movement conditions of the machine.

Preferably, for each machining number representing operation tasks, NC programs, tool information, parameters and a sequence program are stored in the above-mentioned memory as the information necessary for the machine to operate. Also, it is preferable that when information corresponding to an operation task to be performed is not stored in the above-mentioned memory, this information is obtained by way of a communication network.

A second object of the invention is to provide a numerical control apparatus having a machining information management system which is possible to easily enter machining information necessary to operate a machine controlled by the numerical control apparatus into the numerical control apparatus.

To achieve this object, a machining information management system in a numerical control apparatus according to the invention includes a storing device storing a database of information necessary for machining products. The database integrates the information for each product and includes an identifying mark such as a number being assigned to each product. An input device inputting a number or symbol of a product, a machining information retrieval device retrieving from the database machining information corresponding to a number or symbol inputted using the input device, and a device entering machining information extracted from the machining information retrieval device into the numerical control apparatus and making possible machining on the basis of the retrieved machining information.

Preferably, device is additionally provided for displaying, when the machining information corresponding to a number inputted using the input device is not stored in the storing device. Also, a device is provided for obtaining all or part of the machining information pertaining to a designated product from outside by way of a communications interface and enters in the numerical control apparatus all of the machining information or a part thereof combined with machining information retrieved from the database. A display device for displaying machining information pertaining to a product whose number or symbol has been inputted using the input device is preferably added.

With this invention, since the machining information of the NC apparatus is managed with a database, the operator is required only to give an NC machine tool the machining number of an operation task to be done to make the NC apparatus automatically set the machining information necessary for the machining in the NC. Hence the cumbersome procedure and time needed to prepare machining information for an NC machine tool or other machine to be controlled by an NC apparatus can be greatly reduced. Also, since sequence program specific to the operation task is transferred, it is possible to shorten the processing time of the sequence in auxiliary operations of the NC machine tool, and consequently it is possible to shorten the operating time of the machine.

BRIEF DESCRIPTION OF THE DRAWINGS

FIG. 2 shows an example of a table storing the list of necessary information for each type of operation tasks according to the same embodiment;

FIG. 3 shows examples of main programs in the same preferred embodiment;

FIG. 4 shows examples of sub-programs in the same preferred embodiment;

FIG. 5 shows examples of tool files in the same preferred embodiment;

FIG. 7 shows examples of sequence program files in the same preferred embodiment;

FIG. 8A shows an example of machining information shown on a screen in correspondence with an inputted machining number; and FIG. 8B shows an example of a display of more detailed information of a part of the machining information displayed in FIG. 8A, obtained by selecting it on the display screen.

DETAILED DESCRIPTION OF THE PREFERRED EMBODIMENTS

Figure 1:
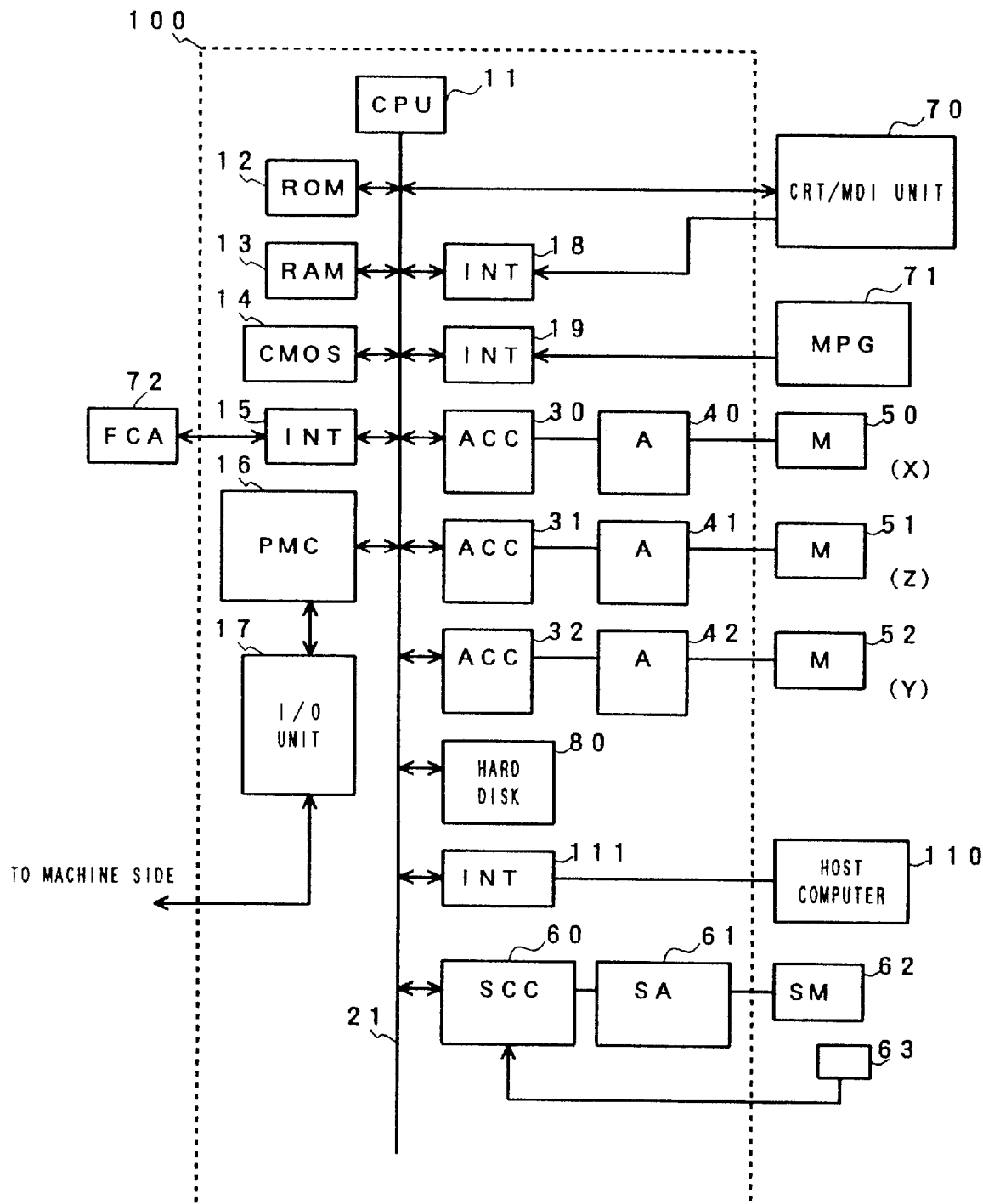
FIG. 1 is a block diagram showing the function of main parts of an NC apparatus of a preferred embodiment of the invention.

FIG. 1 is a block function diagram showing the function of the main parts of an NC apparatus 100 for controlling an NC machine tool. A processor 11 of the NC apparatus 100 controls whole the NC apparatus 100. This processor 11 reads out a system program stored in a ROM 12 through a bus 21 and controls the whole NC apparatus 100 according to this system program. Computing data, display data and various data inputted by an operator through a CRT/MDI unit 70 are temporarily held in a RAM 13. A CMOS memory 14 is constructed as a nonvolatile memory backed up by a battery (not shown) in which data remains stored even if the power supply from the NC apparatus 100 is cut, and stores machining programs, tool offsets and parameters, read in through an interface 15, and machining programs, tool offsets parameters inputted through the CRT/MDI unit 70. Also, various system programs for executing editing mode processing required for creating and editing machining programs and processing for automatic operation are pre-stored in the ROM 12.

The interface 15 is an interface for external equipment that can be connected to the NC apparatus 100, and is connected to an external device 72 such as a floppy cassette adaptor. Machining programs and the like are read in from the external device 72, and it is also possible to store machining programs edited in the NC apparatus 100 on a floppy cassette or the like by way of the external device 72.

A PMC (Programmable Machine Controller) 16 controls auxiliary devices of the NC machine tool, such as actuators for coolant, spindle and automatic tool changer (ATC), with a sequence program built into the NC apparatus 100. That is, according to M functions, S functions and T functions instructed by a machine program, the sequence program converts these into a signal necessary on the auxiliary devices side and outputs it to the auxiliary devices side through an I/O unit 17. Auxiliary devices such as various actuators are operated by this output signal. The PMC 16 also receives signals from various switches and the like of a control panel disposed on the NC machine tool proper and performs necessary processings on them before passing them on to the processor 11.

Image signals of the present position of the axes of the NC machine tool, alarms, parameters and image data and the like are sent to the CRT/MDI unit 70 and displayed on its display. The CRT/MDI unit 70 is a manual data inputting device having a display and a keyboard, and an interface 18 receives data from the keyboard of the CRT/MDI unit 70 and passes it to the processor 11. An interface 19 is connected to a manual pulse generator 71 and receives pulses from the manual pulse generator 71. The manual pulse generator 71 is mounted on the control panel of the NC machine tool and is used for precise positioning of the axes of the NC machine tool by controlling the axes with distributed pulses based on manual operation.

Servo motors 50 to 52 of the axes have built-in position and speed detectors, and position and speed feedback signals are fed back from these position and speed detectors to axis control circuits 30 to 32. The axis control circuits 30 to 32 carry out feedback control of position and speed according to axis movement instructions from the processor 11 and the above-mentioned feedback signals, and output drive signals to servo amplifiers 40 to 42 of the axes. The servo amplifiers 40 to 42 receive these instructions and drive the servo motors 50 to 52 of the axes of the NC machine tool. In FIG. 1, illustration of the feedback of position signals and the feedback of speed signals is omitted.

A position coder 63 is connected to a spindle motor 62. This position coder 63 outputs a return pulse synchronously with the rotation of the spindle. The return pulse is returned to a spindle control circuit 60 and the spindle control circuit 60 performs feedback control of the spindle speed according to a spindle speed instruction sent from the processor 11 and the return pulse, and outputs a spindle speed signal to a spindle amplifier 61. The spindle amplifier 61 receives this spindle speed signal and rotates the spindle motor 62 at the instructed speed and thereby rotationally drives a tool or a workpiece.

The configuration described above is not different from that of a machine using a conventional NC apparatus, but this preferred embodiment differs from a conventional NC apparatus in that a hard disc 80 is connected through the bus, and a host computer 110 is connected by way of a communications interface 111 and a communication network.

FIG. 2 is an example of a table T storing a list of information necessary for the machine tool to operate, for each of a number of operation tasks of the machine tool, i.e. for each machining. This table T is provided in the hard disc 80.

In this table T, a "machining number" is an identification number assigned to an object of an operation task. A "main program number" is a program number of a main machining program for performing the operation task. A "sub-program number" is a program number of a machining program of a subroutine called up by a main program. A "tool file" is a file in which offset numbers designating tools to be used in that operation task and offsets corresponding to those offset numbers are written. A "parameter file" is a file storing parameters that must be set for the respective operation task, and a "sequence program file" is a file storing the sequence program to be used in the respective operation task.

Information corresponding to the main program numbers, the sub-program numbers, the tool file names, the parameter file names and the sequence program file names stored in this table T are also stored in the hard disc 80. FIG. 3 is an example of the content of main programs corresponding to main program numbers in the table T, in which here "00001", "00002" are program numbers1, "WORK1", "WORK2" are the names of those programs; G92X150. Y200 are instructions for setting a coordinate system1, G90G00XOYO is a positioning instruction1, M98P1005 is a command ordering branching to a sub-program 010051, and M30 is a program end command.

FIG. 4 is an example of the content of sub-programs corresponding to sub-program numbers in the table T. "01005", "01010" are sub-program numbers1, "SUB1", "SUB2" are the names of the sub-programs; G01X15. Y36 is a cutting instruction, and M99 indicates a return to the main program.

FIG. 5 is an example of tool files. In this figure, T1, T2 and T3 are names of tool files in which the offset numbers 01 to 03 respectively correspond to an X-axis direction offset, a Z-axis direction offset, a Y-axis direction offset, a tip radius R compensation, which is the roundness of the tip of the tool, and a virtual tip setting number indicating the direction of the tool tip. Here, an offset is a compensation for making the commanded position specified by the program coincide with the cutting position of the tool.

Figure 6:
FIG. 6 shows examples of parameter files in the same preferred embodiment.

FIG. 6 shows an example of parameter files. P1, P2 and P3 are names of parameter files1, 0003 to 0125 are parameter numbers1, and 00100110 to 4500 are the contents of the parameters corresponding to the parameter numbers. 00100110 and 00100011 are called bit-type parameters1. Different movements and functions are assigned to each bit, and the on/off of a certain movement or function is determined according to the state (1 or 0) of the bit concerned. 3000, 4500 are called byte type parameters, and set upper limit values, lower limit values, and standard values and so on of corresponding movements and functions.

FIG. 7 shows an example of a sequence program file. This figure is part of a logic diagram (ladder diagram) showing sequence programs, and L1, L2 and L3 are file names of sequence programs. The R1 and R2 of the sequence program L1 denote input signals, and W1 denotes an output signal. In the case where the sequence program is L1, the PMC 16 reads the state of the input signals R1 and R2, and when the states of both R1 and R2 are "0", the output signal remains unchanged, but when either R1 or R2 is "1", the output signal W1 becomes "1", and this output signal is passed to the machine side via the I/O unit 17, whereupon the machine side turns on the corresponding actuator.

The table T shown in FIG. 2, and the corresponding machining information of FIG. 3 through FIG. 7, are stored in the hard disc 80 through the bus 21 from an external device 72 such as a floppy cassette adaptor, or the CRT/MDI unit 70 or the host computer 110. When an operator inputs a machining number through the CRT/MDI unit 70, the processor 11 refers to the table T for retrieval and displays the main program number, the sub-program numbers, the tool file name, the parameter file name and the system program file name corresponding to the respective task on the display of the CRT/MDI unit 70.

If a corresponding machining program, sub-program, tool file, parameter or system program file is not on the hard disc 80, the pertinent information is retrieved from the files in the host computer 110 via the communications interface 111 and the result is indicated on the display, and the corresponding main program, sub-programs, tool file, parameter file or sequence program file is displayed on the display of the CRT/MDI unit 70.

When an operator then inputs an instruction for requiring these pieces of machining information to be transferred, the selected main program, sub-programs, tool file and parameters are read from the hard disc or the host computer and transferred to the CMOS memory 14 for storing operating and movement conditions, and the sequence program file is transferred to the PMC 16.

FIG. 8A and FIG. 8B show examples of displays used in the above-mentioned machining carried out by the operator. For example, when the operator selects the machining number WORK3 (see FIG. 2) as the operation task, the kind of machining information shown in FIG. 8A is displayed on the display of the CRT/MDI unit 70. When a corresponding file is in the host computer, an asterisk (*) is attached to the corresponding file name. When tool file T3 displayed for confirmation is selected and inputted, the tool file shown in FIG. 8B is displayed, and the operator can be informed of tools necessary for the operation task, so that if a required tool is not installed on the machine, the operator installs it accordingly. When this confirmation is finished the operator gives an instruction for transferring these files to a predetermined memory of the NC apparatus.

In this way, when a machining number is specified by operator, corresponding machining information is automatically transferred to a corresponding memory of the NC apparatus 100, and machining information for operating an NC machine tool or a machine having an NC apparatus as a control apparatus is prepared.

What is claimed is:

1. A method for setting operation conditions in a machine controlled by a numerical control apparatus, comprising:

storing a set of information for a corresponding operation task, required when the machine performs the corresponding operation task, in a memory of the numerical control apparatus;

specifying a product in the information using an identifying mark;

inputting the machining number and reading from the memory the set of information corresponding to the inputted machining number such that the machine performs the operation task; and setting the set of information, which was read from the memory, as the operation conditions of the machine when it performs the operation task.

2. The method for setting operation information in a machine controlled by a numerical control apparatus according to claim 1, wherein for each machining number corresponding to each operation task, an NC program, tool information, parameters and a sequence program are stored in the memory as the information for the machine to operate.

3. The method for setting operating information in a machine controlled by a numerical control apparatus according to claim 1, wherein when information corresponding to an operation task to be performed is not stored in the memory, the information is obtained by way of a communication network.

4. The machine information control system in a numerical control apparatus according to claim 1, further comprising means for obtaining at least part of machining information related to a designated product, obtained from outside of the system by using a communications interface and entering in the numerical control apparatus a combination of the machining information and the machining information extracted from the database.

5. The machine information control system in a numerical control apparatus according to claim 1, further comprising a display device displaying machining information related to a product having an identifying mark which has been inputted using the inputting means.

6. A machining information management system in a numerical control apparatus, comprising:

storing means for accumulating information for machining of products, the information for each product including an identifying mark, and storing the information as a database;

inputting means with which each identifying mark specifying a product is inputted using keys;

machining information extracting means for extracting from the database machining information corresponding to one of the identifying marks inputted using the inputting means; and means for entering machining information extracted by the machining information extracting means into the numerical control apparatus to control the system according to the machining information.

7. The machine information control system in a numerical control apparatus according to claim 6, further comprising means for displaying that no information is stored when no machining information corresponding to an identifying mark is stored in the storing means.

8. A computer readable storage medium storing a program controlled by a computer, comprising:

storing information, for a machine to operate, in a memory of a numerical control apparatus by an operation task to be performed during operation;

specifying a product in the information using an identifying mark;

selecting an operation task at the time of operation based on a machining number previously input, and inputting a selected operation task to read out information to perform the inputted operation task from the memory; and setting operation conditions of the machine based on the read out information.

9. A machining information management system in a numerical control apparatus, comprising:

a storing unit accumulating information for machining of products, the information for each product including an identifying mark, and storing the information as a database;

an inputting unit specifying a product for each identifying mark;

a machining information extracting unit extracting from the database machining information corresponding to one of the identifying marks inputted using the inputting unit; and a unit for entering information extracted by the machining information extracting unit into the numerical control apparatus to control the system according to the machining information.

10. A machine controlled by a numerical control apparatus, comprising: a first unit including;

a memory storing a set of information, including an identifying mark for a product, corresponding to an operation to instruct the machine, and an interface coupled to a bus for accessing the memory; and a second unit, coupled to the interface, receiving and transmitting information to the memory.

* * * * *